(12) United States Patent
Fekete et al.

(10) Patent No.: US 12,582,926 B2
(45) Date of Patent: Mar. 24, 2026

(54) METHOD OF OPERATING A LIQUID CHROMATOGRAPHY ARRANGEMENT, A LIQUID CHROMATOGRAPHY ARRANGEMENT, AND A CHROMATOGRAPHY SYSTEM

(71) Applicant: Waters Technologies Corporation, Milford, MA (US)

(72) Inventors: Szabolcs Fekete, Ville la Grand (FR); Michael O. Fogwill, Uxbridge, MA (US); Matthew A. Lauber, North Smithfiled, RI (US)

(73) Assignee: Waters Technologies Corporation, Milford, MA (US)

( * ) Notice: Subject to any disclaimer, the term of this patent is extended or adjusted under 35 U.S.C. 154(b) by 595 days.

(21) Appl. No.: 17/988,073

(22) Filed: Nov. 16, 2022

(65) Prior Publication Data

US 2023/0149833 A1 May 18, 2023

Related U.S. Application Data

(60) Provisional application No. 63/280,745, filed on Nov. 18, 2021.

(51) Int. Cl.
*B01L 3/00* (2006.01)
*B01D 15/08* (2006.01)
(Continued)

(52) U.S. Cl.
CPC ......... *B01D 15/422* (2013.01); *B01D 15/163* (2013.01); *B01D 15/22* (2013.01);
(Continued)

(58) Field of Classification Search
CPC .... B01D 15/422; B01D 15/163; B01D 15/22; G01N 30/32; G01N 30/72; G01N 2030/326; G01N 2030/8831
See application file for complete search history.

(56) References Cited

U.S. PATENT DOCUMENTS

| | | | | |
|---|---|---|---|---|
| 5,192,406 A | * | 3/1993 | Woolley ........... | G01N 27/44752 |
| | | | | 204/454 |
| 2006/0201885 A1 | * | 9/2006 | Davison ............... | G01F 23/168 |
| | | | | 210/741 |

(Continued)

OTHER PUBLICATIONS

Gritti, Fabrice, Joseph J. Stankovich, and Georges Guiochon. "Potential advantage of constant pressure versus constant flow gradient chromatography for the analysis of small molecules." Journal of Chromatography A 1263 (2012): 51-60. (Year: 2012).*

(Continued)

*Primary Examiner* — Jennifer Wecker

*Assistant Examiner* — Oyeleye Alexander Alabi

(74) *Attorney, Agent, or Firm* — Schmeiser, Olsen & Watts LLP

(57) ABSTRACT

There is provided a method of operating a liquid chromatography arrangement, the liquid chromatography arrangement comprising: a solvent pump arranged to flow a liquid solvent over a liquid chromatography column; a restrictor arranged to restrict the liquid solvent from leaving the liquid chromatography column; and a liquid pump arranged to provide liquid flow between the liquid chromatography column and the restrictor, the method comprising: flowing the liquid solvent through the liquid chromatography column using the solvent pump; and controlling a liquid pressure within the liquid chromatography column by providing a liquid flow between the liquid chromatography column and the restrictor using the liquid pump.

14 Claims, 6 Drawing Sheets

(51) Int. Cl.

| | |
|---|---|
| *B01D 15/16* | (2006.01) |
| *B01D 15/22* | (2006.01) |
| *B01D 15/42* | (2006.01) |
| *B01F 33/302* | (2022.01) |
| *B01F 33/3033* | (2022.01) |
| *B01L 7/00* | (2006.01) |
| *B01L 9/00* | (2006.01) |
| *B65G 47/80* | (2006.01) |
| *B82Y 20/00* | (2011.01) |
| *B82Y 30/00* | (2011.01) |
| *B82Y 40/00* | (2011.01) |
| *C12M 1/34* | (2006.01) |
| *C12M 3/06* | (2006.01) |
| *C12N 1/14* | (2006.01) |
| *C12N 1/20* | (2006.01) |
| *C12Q 1/02* | (2006.01) |
| *C12Q 1/6806* | (2018.01) |
| *C12Q 1/6844* | (2018.01) |
| *C12Q 1/6848* | (2018.01) |
| *C12Q 1/686* | (2018.01) |
| *G01N 15/10* | (2024.01) |
| *G01N 15/14* | (2024.01) |
| *G01N 15/1433* | (2024.01) |
| *G01N 21/29* | (2006.01) |
| *G01N 21/65* | (2006.01) |
| *G01N 30/02* | (2006.01) |
| *G01N 30/32* | (2006.01) |
| *G01N 30/72* | (2006.01) |
| *G01N 33/543* | (2006.01) |
| *G01N 33/557* | (2006.01) |
| *G01N 33/574* | (2006.01) |
| *G01N 33/58* | (2006.01) |
| *G01N 30/88* | (2006.01) |

(52) U.S. Cl.
CPC ............. *G01N 30/32* (2013.01); *G01N 30/72* (2013.01); *G01N 2030/326* (2013.01); *G01N 2030/8831* (2013.01)

(56) References Cited

U.S. PATENT DOCUMENTS

| | | | | |
|---|---|---|---|---|
| 2009/0065416 A1* | 3/2009 | Hoffmann | ............ | G01N 30/603 |
| | | | | 428/332 |
| 2009/0194483 A1* | 8/2009 | Robotti | ................ | B01D 15/163 |
| | | | | 210/659 |
| 2016/0375376 A1* | 12/2016 | Wikfors | ............... | B01D 15/163 |
| | | | | 422/537 |
| 2019/0369061 A1* | 12/2019 | Fogwill | .............. | G01N 30/7206 |
| 2019/0369064 A1* | 12/2019 | Fogwill | .............. | G01N 30/6017 |

OTHER PUBLICATIONS

"Bands, Peaks and Band Spreading," Waters Corporation, 2021, https://www.waters.com/nextgen/us/en/education/primers/beginner-s-guide-to-uplc/bands-peaks-and-band-spreading.html.

"Improving Productivity with UPLC Technology," Waters Corporation, 2021, https://www.waters.com/nextgen/us/en/education/primers/beginner-s-guide-to-uplc/improving-productivity-with-uplc-technology.html.

"The Consequence of Improved Performance," Waters Corporation, 2021, https://www.waters.com/nextgen/us/en/education/primers/beginner-s-guide-to-uplc/the-consequence-of-improved-performance.html.

"Beginner's Guide to Convergence Chromatography: Introduction" Waters Corporation, 2021, https://www.waters.com/nextgen/us/en/education/primers/beginner-s-guide-to-convergence-chromatography.html.

"Beginner's Guide to Convergence Chromatography 2: Fundamentals Of Convergence Chromatography," Waters Corporation, 2021, https://www.waters.com/nextgen/us/en/education/primers/beginner-s-guide-to-convergence-chromatography/fundamentals-of-convergence-chromatography.html.

"Beginner's Guide to Convergence Chromatography 3: How a LC Instrument Was Modified To Accommodate CO," Waters Corporation, 2021, https://www.waters.com/nextgen/us/en/education/primers/beginner-s-guide-to-convergence-chromatography/how-a-lc-instrument-was-modified-to-accommodate-co2.html.

"Beginner's Guide to Convergence Chromatography 4: Method Development With CC," Waters Corporation, 2021, https://www.waters.com/nextgen/us/en/education/primers/beginner-s-guide-to-convergence-chromatography/method-development-with-convergence-chromatography.html.

"Beginner's Guide to Convergence Chromatography 6: Conclusion," Waters Corporation, 2021, https://www.waters.com/nextgen/us/en/education/primers/beginner-s-guide-to-convergence-chromatography/conclusion.html.

Chester, T.L. and J.D. Pinkston, "Pressure-regulating fluid interface and pahse behavior considerations in the coupling of packed-column spercritical fluid chromatography with low-pressure detectors," Journal of Chromatography A, 807, 1998, pp. 265-273.

"Beginner's Guide to Convergence Chromatography 5: CC Application Scopes," Waters Corporation, 2021, https://www.waters.com/nextgen/us/en/education/primers/beginner-s-guide-to-convergence-chromatography/convergence-chromatography-application-scopes.html.

Pinkston, David J. "Advantages and drawbacks of popular supercritical fluid chromatography/mass spectrometry interfacing approaches—a user's perspective," Eur. J. Mass Spectrom. 11, 2005, pp. 189-197.

"The Promise of Small Particles," Waters Corporation, 2021, https://www.waters.com/nextgen/us/en/education/primers/beginner-s-guide-to-uplc/the-promise-of-small-particles.html.

"Beginner's Guide to UPLC: Introduction," Waters Corporation, 2021, https://www.waters.com/nextgen/us/en/education/primers/beginner-s-guide-to-uplc.html.

Fekete, et al., "Influence of pressure and temperature on molar volume and retention properties of peptides in ultra-high pressure liquid chromatography," Journal of Chromatography A, 1311, 2013, pp. 65-71.

Fekete, et al. "The effect of pressure and mobile phase velocity on the retention properties of small analytes and large biomolecules in ultra-high pressure liquid chromatography," Journal of Chromatography A, 1270, 2012, pp. 127-138.

* cited by examiner

METHOD OF OPERATING A LIQUID CHROMATOGRAPHY ARRANGEMENT, A LIQUID CHROMATOGRAPHY ARRANGEMENT, AND A CHROMATOGRAPHY SYSTEM

RELATED APPLICATION

This application is a non-provisional patent application claiming priority to U.S. Provisional Patent Application No. 63/280,745 filed Nov. 18, 2021, titled "Method of operating a liquid chromatography arrangement, a liquid chromatography arrangement, and a chromatography system," which is incorporated herein by reference.

FIELD

This specification relates to a liquid chromatography arrangement and a methods of operating thereof. More particularly, although not exclusively, this specification relates to a liquid chromatography arrangement, a method of operating a liquid chromatography arrangement, a method of operating a mass spectrometer arrangement, a computer readable medium, a computer program, a system, a chromatography system, a mass spectrometry system, a further computer program, a further computer readable medium, a further system, a further chromatography system, and a further mass spectrometry system.

It is a non-exclusive aim to provide an improved liquid chromatography arrangement, an improved mass spectrometer, improved methods of operating liquid chromatography arrangements, and an improved chromatography system.

BACKGROUND

It is known to use liquid chromatography arrangements and methods, for example high-pressure liquid chromatography, to separate, identify, and/or quantify components of mixtures.

SUMMARY

There is provided a method of operating a liquid chromatography arrangement, the liquid chromatography arrangement comprising:
    a solvent pump arranged to flow a liquid solvent over a liquid chromatography column;
    a restrictor arranged to restrict the liquid solvent from leaving the liquid chromatography column; and
    a liquid pump arranged to provide liquid flow between the liquid chromatography column and the restrictor,
the method comprising:
    flowing the liquid solvent through the liquid chromatography column using the solvent pump; and
    controlling a liquid pressure within the liquid chromatography column by providing a liquid flow between the liquid chromatography column and the restrictor using the liquid pump.

The pressure within the liquid chromatography column may be controlled independently of a flow rate through the liquid chromatography column by controlling the liquid flow between the liquid chromatography column and the restrictor using the liquid pump.

The flow rate through the liquid chromatography column may be controlled to be substantially constant by controlling the solvent pump.

The pressure within the liquid chromatography column may be varied over a period of time independently of the flow rate through the liquid chromatography column.

The pressure within the liquid chromatography column may be varied over a period of time from a first pressure value to a second pressure value.

The pressure within the liquid chromatography column may be varied from the first pressure value to the second pressure value after elution or detection of a component of an analyte.

The difference between the first pressure value and the second pressure value may be at least 100 bar, 200 bar, 300 bar, or 400 bar.

An analyte may be flowed over the liquid chromatography column.

The analyte may have a mass greater than 5 kDa. The analyte may have a mass of a range from 5 kDa to 150 kDa. The analyte may have a mass of a range from 5 kDa to 200 kDa.

The analyte may be a large biopolymer.

The large biopolymer may be a peptide, a protein, an oligo-nucleotide, or a nucleic acid.

The pressure within the liquid chromatography column may be controlled to be 450 bar or more.

The pressure within the liquid chromatography column may be controlled to be 600 bar or more; or 700 bar or more; or 800 bar or more; or 900 bar or more; or 1000 bar or more; or 1100 bar or more; or 1200 bar or more; or 1300 bar or more; or 1400 bar or more; or 1500 bar or more.

The pressure within the liquid chromatography column may be controlled to be within a range of from 250 bar to 1500 bar; or from 450 bar to 1500 bar; or from 450 bar to 1200 bar; or from 450 bar to 900 bar.

The liquid chromatography arrangement may further comprise a detector arranged to detect the presence of an analyte in a flow of liquid solvent from the liquid chromatography column.

The method may further comprise detecting the presence of an analyte in the flow of liquid solvent from the liquid chromatography column.

The detector may be or may comprise a UV detector.

The detector may be or may comprise a mass spectrometer.

There is also provided a method of operating a mass spectrometer arrangement. The method of operating a mass spectrometer arrangement may comprise the method described above of operating a liquid chromatography arrangement.

There is also provided a liquid chromatography arrangement comprising:
    a solvent pump arranged to flow a liquid solvent over a liquid chromatography column;
    a restrictor arranged to restrict the liquid solvent from leaving the liquid chromatography column; and
    a liquid pump arranged to provide liquid flow between the liquid chromatography column and the restrictor.

In use, the pressure within the liquid chromatography column may be variable independently of the flow rate through the liquid chromatography column.

The pressure within the liquid chromatography column may be controllable to be 450 bar or more.

There is also provided a mass spectrometer comprising the chromatography arrangement.

There is also provided a computer readable medium having instructions stored thereon which, when executed by a processor, cause the performance of a method described above of operating a liquid chromatography arrangement.

There is also provided a computer program comprising instructions which, when executed by a processor, cause the performance of a method described above of operating a liquid chromatography arrangement.

There is also provided a system comprising at least one processor and a computer readable medium, wherein the computer readable medium has instructions stored thereon which, when executed by the at least one processor, cause the system to perform a method described above of operating a liquid chromatography arrangement.

The system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

There is also provided a chromatography system comprising at least one processor and a computer readable medium, wherein the computer readable medium has instructions stored thereon which, when executed by the at least one processor, cause the chromatography system to perform a method described above of operating a liquid chromatography arrangement.

The chromatography system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

There is also provided a mass spectrometry system comprising at least one processor and a computer readable medium, wherein the computer readable medium has instructions stored thereon which, when executed by the at least one processor, cause the mass spectrometry system to perform a method described above of operating a liquid chromatography arrangement.

The mass spectrometry system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

A further computer program is also provided. The computer program may comprise instructions which, when the program is executed by a processor, cause the performance of a method described above of operating a mass spectrometer arrangement.

There is also provided a further computer readable medium having instructions stored thereon which, when executed by a processor, cause the performance of a method described above of operating a mass spectrometer arrangement.

There is also provided a further system comprising at least one processor and a computer readable medium, wherein the computer readable medium has instructions stored thereon which, when executed by the at least one processor, cause the system to perform a method described above of operating a mass spectrometer arrangement.

There is also provided a further chromatography system comprising at least one processor and a computer readable medium, wherein the computer readable medium has instructions stored thereon which, when executed by the at least one processor, cause the further chromatography system to perform a method described above of operating a mass spectrometer arrangement.

The further chromatography system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

There is also provided a further mass spectrometry system comprising at least one processor and a computer readable medium, wherein the computer readable medium has instructions stored thereon which, when executed by the at least one processor, cause the further mass spectrometry system to perform a method described above of operating a mass spectrometer arrangement.

The further mass spectrometry system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

BRIEF DESCRIPTION OF THE FIGURES

In order that the present disclosure may be more readily understood, preferable embodiments thereof will now be described, by way of example only, with reference to the accompanying drawings, in which:

FIG. 2a shows a linear pressure gradient; FIG. 2b shows a convex pressure gradient; FIG. 2c shows a concave pressure gradient;

DETAILED DESCRIPTION OF THE DISCLOSURE

In liquid chromatography, pressure may have an impact on solute retention (e.g. a solute dissolved or otherwise present in a solvent); however, pressure is rarely, if at all, used in practice as a parameter (variable) to control retention or selectivity of a solute. Pressure may impact the retention of large solutes within a column of a liquid chromatography arrangement. The larger an analyte (i.e. a component of a mixture), the higher the impact of pressure may be, since pressure effects may be directly related to the molar volume of the solute. On the other hand, the conformation of larger molecules (e.g. peptides, proteins, oligo-nucleotides, nucleic acids) may also vary with pressure. Thus the interacting solute surface area may change as well, and therefore a significant change in retention time and selectivity of solutes and/or analytes may be expected when changing operating pressure. In the case of proteins (e.g. biopolymers having a size of approximately 5 kDa to 150 kDa), the relative increase in retention caused by pressure (e.g. up to, for example, 1000 bar compared to 100 bar) may increase by approximately a hundred to a multiple-thousand percent. It has been found that a greater than 3000 percent higher retention time may be achieved for biopolymers of approximately 17 kDa, when the pressure is increased from 100 to 1100 bar. The pressure induced change in retention may also be temperature dependent.

Since pressure may significantly impact the retention time of large solutes as described above, pressure can be an important factor (variable) to tune/adjust selectivity of a solute (e.g. the distance between solute peaks). For example, when combining pressure, temperature, and mobile phase strength together, new possibilities open to tune selectivity. Not only isobar conditions set at various pressures may be considered but pressure gradients may also be used to further extend the tuneability of liquid chromatography arrangements.

Figure 1:
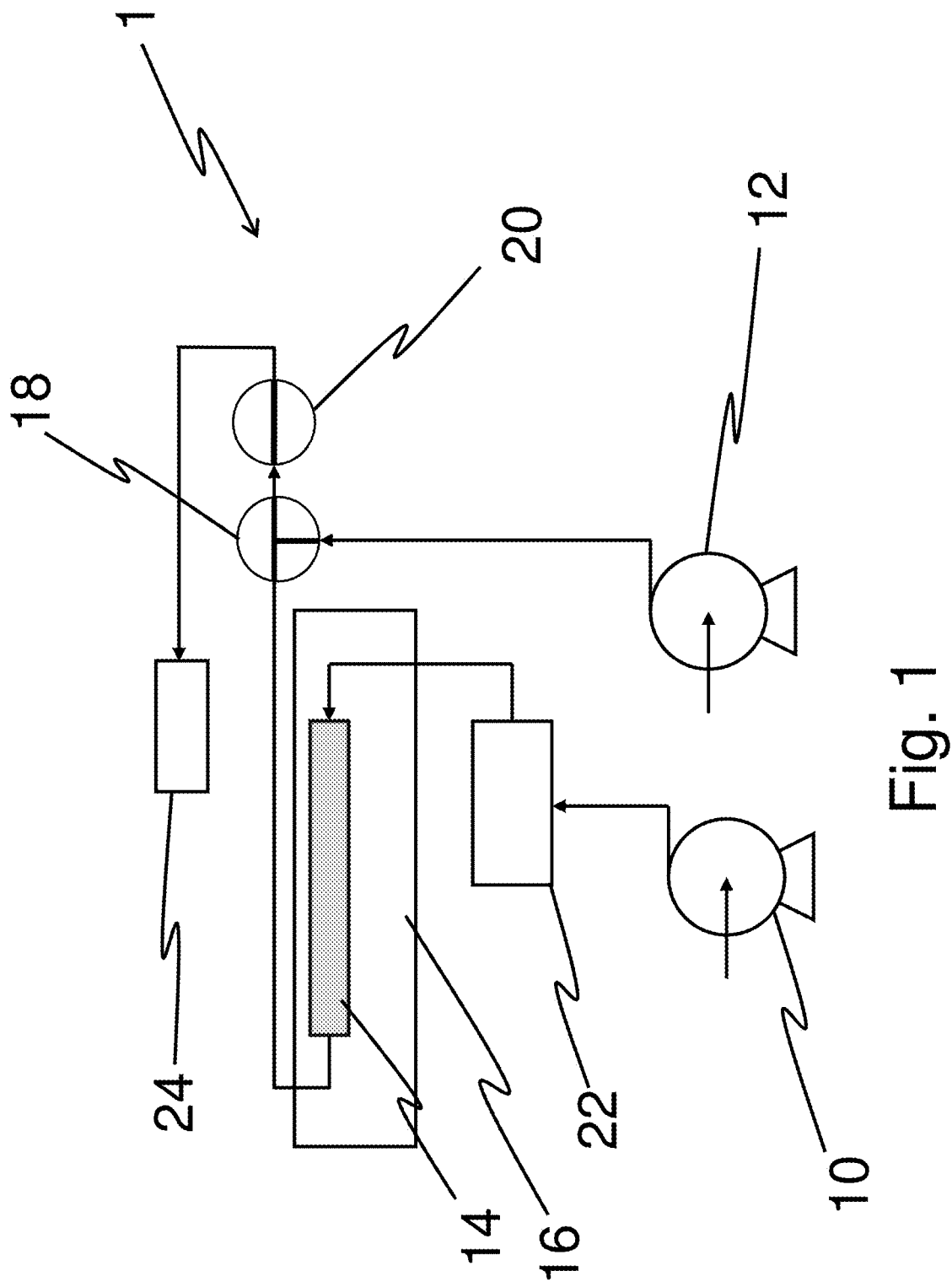
FIG. 1 is a schematic of a liquid chromatography arrangement according to an embodiment.

With reference to FIG. 1, there is provided a method of operating a liquid chromatography arrangement 1. The liquid chromatography arrangement 1 comprises: a solvent pump 10 arranged to flow a liquid solvent over a liquid chromatography column 14; a restrictor 20 arranged to restrict the liquid solvent from leaving the liquid chromatography column 10; and a liquid pump 12 arranged to provide liquid flow between the liquid chromatography column 14 and the restrictor 20. The method comprises: flowing the liquid solvent through the liquid chromatography column 14 using the solvent pump 10; and controlling a liquid pressure dropped on the liquid chromatography column 14 by providing additional post column liquid flow directed through the restrictor 20 using the liquid pump 12. (E.g. controlling a liquid pressure within the liquid chromatography column 14 by providing a liquid flow between the liquid chromatography column 14 and the restrictor 20 using the liquid pump 12.)

The solvent may comprise at least one solute. Accordingly, flowing liquid solvent through the liquid chromatography column 14 may comprise flowing liquid solvent and (liquid) solute(s) through the liquid chromatography column 14 using the solvent pump 10.

Methods of operating liquid chromatography arrangements 1 as described above may provide advantages. In particular, the restrictor 20 may increase the pressure in the liquid chromatography column 14, and the liquid pump 12 may allow for further pressure control within the liquid chromatography column 14. In other words, controlling a liquid pressure within the liquid chromatography column 14 by providing a liquid flow between the liquid chromatography column 14 and the restrictor 20 using the liquid pump 12 may allow for increased processing control. For example, in a liquid chromatography arrangement not comprising a liquid pump (i.e. only containing a solvent pump and a restrictor), whilst the pressure in the liquid chromatography column may be controlled by controlling the flow rate of the solvent through a liquid chromatography column and restricting the flow with the restrictor, the pressure within the liquid chromatography column may ultimately be dependent on the flow rate (controlled by the solvent pump). In particular, the restrictor may restrict flow by a set amount (e.g. if the restrictor is a capillary restrictor), such that the flow rate through the liquid chromatography column may be need to be controlled to reach a desired pressure. Accordingly, methods of operating liquid chromatography arrangements 1 as described above may allow for increased processing control of flow rates and pressures in use, e.g. there may be reduced interdependency of flow rate through the liquid chromatography column 14 and pressure within the liquid chromatography column 14 compared to methods carried out on liquid chromatography arrangements not comprising a liquid pump.

Figures 2A, 2B, 2C:
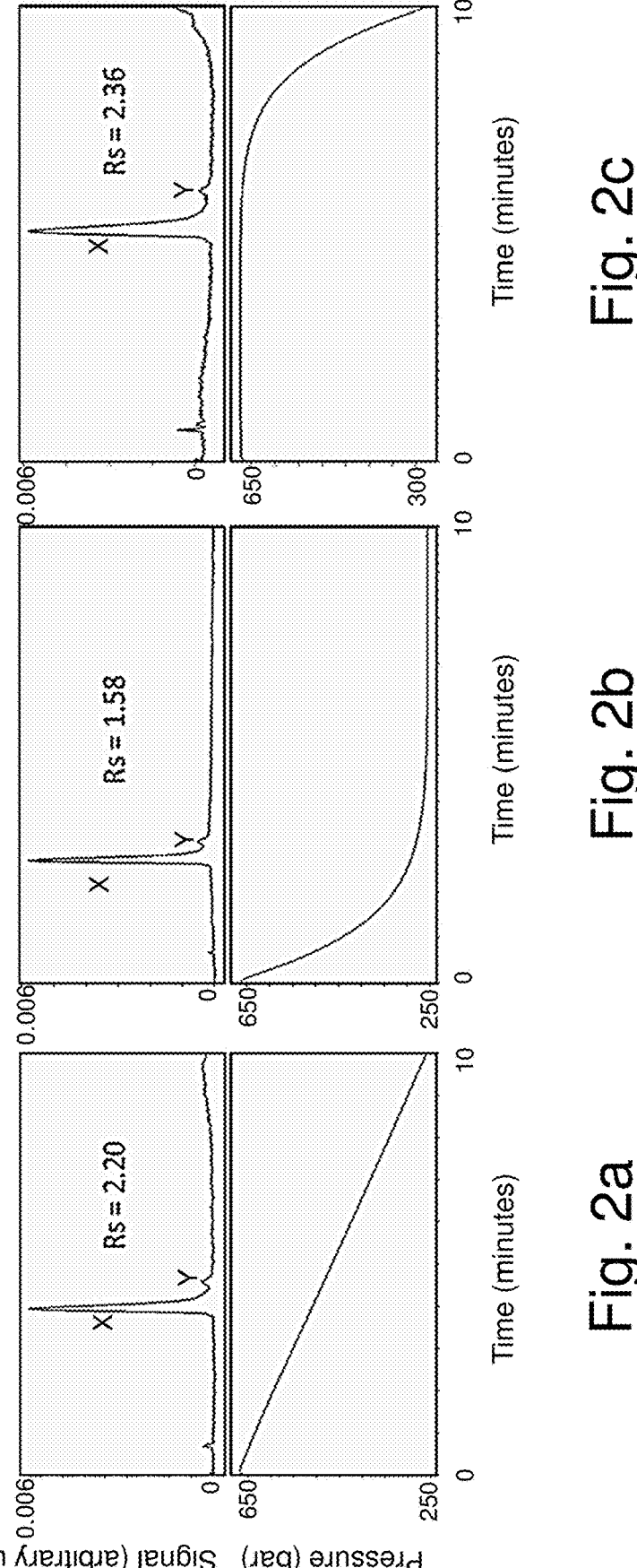
FIGS. 2a, 2b and 2c show graphs of the effect of pressure gradients within a liquid chromatography column on the retention time of bovine insulin (X) and an impurity (Y), carried out using the method of operating a liquid chromatography arrangement according to an embodiment.
Figure 3:
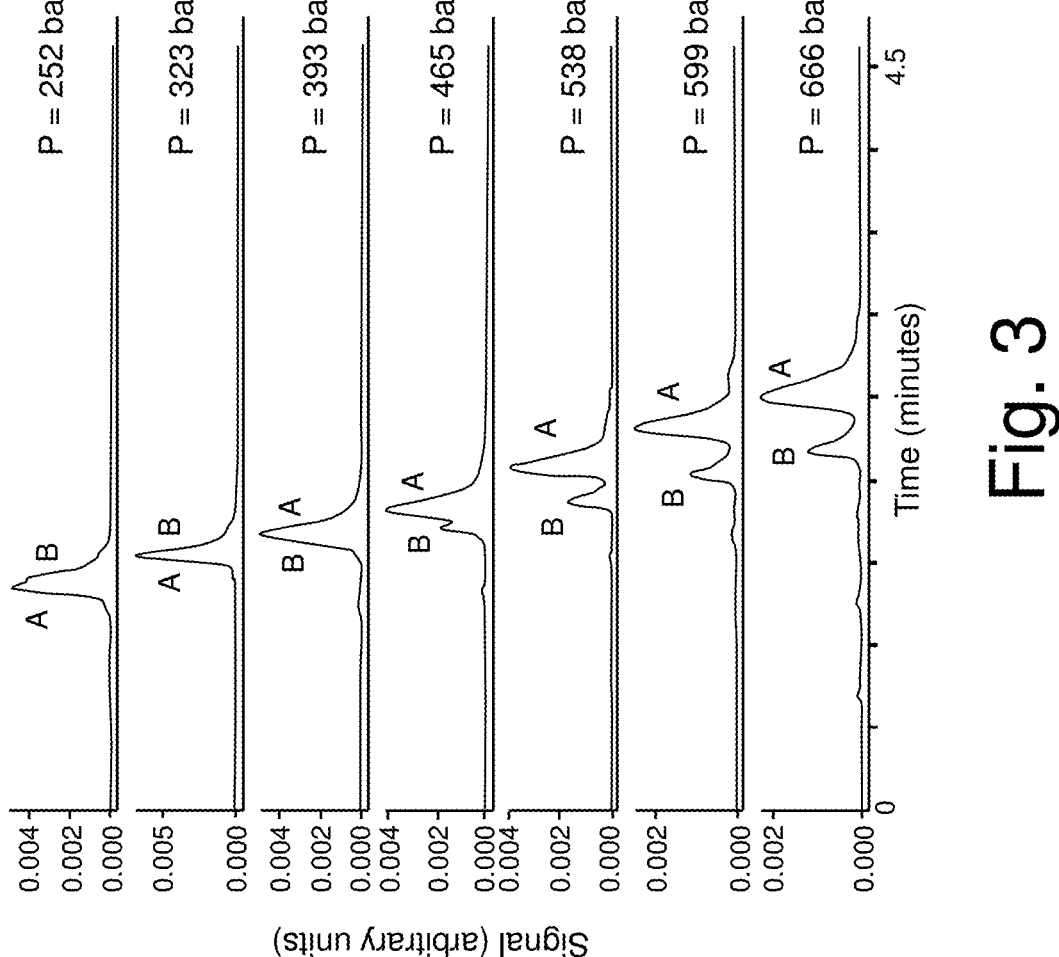
FIG. 3 shows graphs of the effect of pressure on peak separation and retention time of two biopolymers, bovine insulin (A) and cytochrome C (B)
Figure 4:
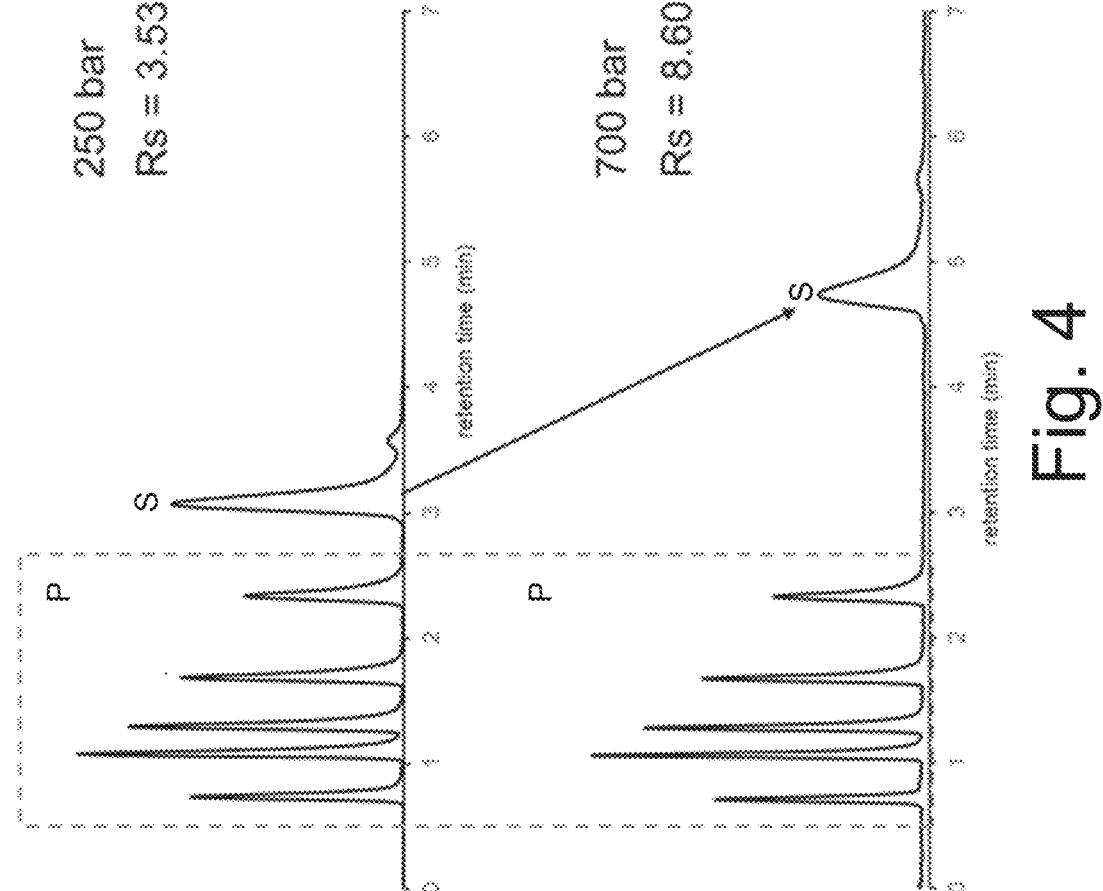
FIG. 4 shows graphs of the effect of pressure on peak separation of insulin (S) and parabens (P)
Figure 6:
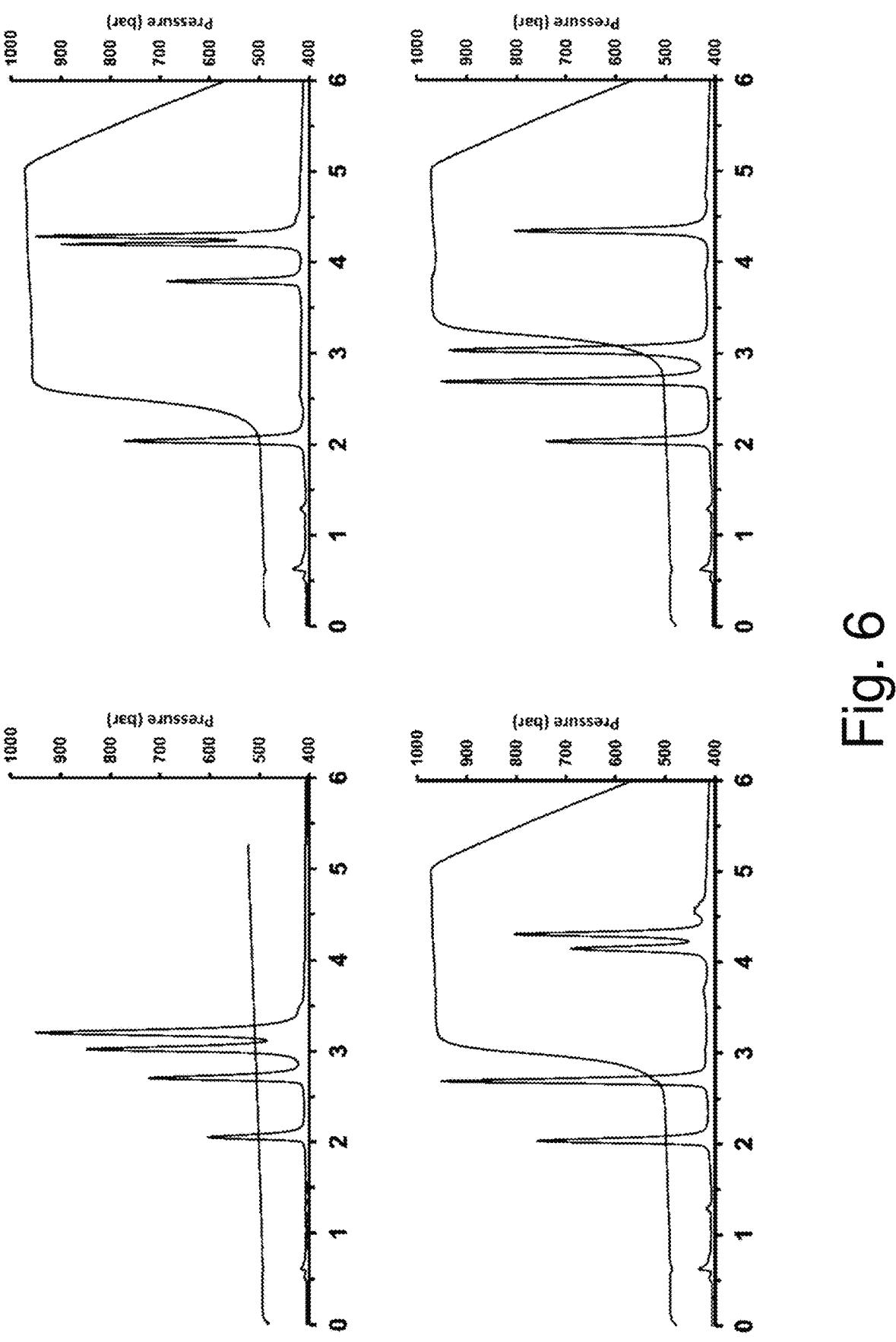
FIG. 6 shows graphs of the effect of pressure changes within a liquid chromatography column on retention times of synthetic oligo-nucleotides.

Further, control of pressure as described above may allow for increased separation of solute(s) present in the solvent; as shown in FIGS. 2, 3, 4, and 6, pressure within the liquid chromatography column 14 may be controlled to modify (e.g. increase) separation representative of the solute(s), which may result in a change of (e.g. an increase of) peak resolution. In particular, FIG. 2 shows the separation of a solute (bovine insulin X) from an impurity (Y), showing that changing the pressure within the liquid chromatography may change the retention time of a solute and therefore change the resolution of solute peaks, represented by Rs in FIG. 2 (a larger value Rs indicates a higher peak resolution). FIG. 3 shows how pressure may affect peak separation and retention time of two biopolymers, bovine insulin (A) and cytochrome C (B). FIG. 4 shows graphs of the effect of pressure on peak separation of a solute (insulin (S)) and parabens (P) and therefore the effect of pressure on the resolution of the solute, represented by Rs in FIG. 4 (a larger value Rs indicates a higher peak resolution). FIG. 6 shows graphs of the effect of pressure changes on retention times of synthetic oligo-nucleotides. Accordingly, precise control of the pressure within the liquid chromatography column 14 as described above may allow for undesirable solute peak positioning to be altered, e.g. pressure may be controlled to avoid non-desirable properties such as overlapping solute peaks, and instead a pressure (or pressure gradient) may be selected such that solute peaks are non-overlapping, e.g. the peaks representative of the solute(s) (and/or any possible impurity(ies)) may be entirely or at least mostly separated from one-another).

Controlling a liquid pressure within the liquid chromatography column 14 by providing a liquid flow between the liquid chromatography column 14 and the restrictor 20 using the liquid pump 12 may be achievable since the liquid solvent may be incompressible; therefore, introduction of liquid between the liquid chromatography column 14 and the restrictor 20 may directly increase pressure in the liquid chromatography column 14, e.g. by applying back pressure by introducing an incompressible liquid against which the incompressible solvent flow through the liquid chromatography column 14 must act. Furthermore, since the liquid being introduced between the liquid chromatography column 14 and the restrictor 20 may be incompressible, small flow rates of liquid flow (e.g. from 0.001 mL per minute to 1 mL per minute or any range or value therebetween) may be utilised to precisely control pressure within the liquid chromatography column 14.

It is a realisation of the present disclosure that the methods of pressure control described herein may be used with liquid chromatography arrangements. Whilst superficially similar arrangements may have been used in Supercritical Fluid Chromatography (SFC), the method described herein has been applied to liquid chromatography for the first time with surprising success, as detailed herein. In particular, it is a realisation of the present disclosure that large solutes are particularly sensitive to pressure changes; accordingly, analysis of large solutes, in particular, benefit from pressure control in liquid chromatography. In addition, pressure control is an intrinsic part of SFC and in SFC the mobile phase viscosity is much lower, in contrast with liquid chromatography.

The pressure within the liquid chromatography column 14 may be controlled independently of a flow rate through the liquid chromatography column 14 by controlling the liquid flow between the liquid chromatography column 14 and the restrictor 20 using the liquid pump 12.

Controlling the pressure within the liquid chromatography column 14 independently of a flow rate through the liquid chromatography column 14 by controlling the liquid flow between the liquid chromatography column 14 and the restrictor 20 using the liquid pump 12 may provide advantages. In particular, the flow rate through the liquid chromatography column 14 may be set to a desired flow rate using the solvent pump 10, and the pressure within the liquid chromatography column 14 may be controlled using the liquid pump 12; this may allow for increased separation of peaks representative of the solute(s), e.g. increased resolution of peaks representative of the solute(s) (for example, due to the reduced interdependence between solvent flow rate and pressure within the liquid chromatography column 14). In liquid chromatography arrangements not comprising the liquid pump as described above, increasing pressure may require increasing a solvent flow rate through a liquid chromatography column (e.g. if pressure is caused by a restrictor). When increasing pressure in liquid chromatography arrangements not comprising the liquid pump as described above, the increased flow rate used to increase the pressure in the liquid chromatography column may be likely to cause overlap of solute peaks.

When carrying out the method as described above, heating effects within the liquid chromatography column 14 may be reduced, e.g. it may not be required to control (e.g. increase) the flow rate through the liquid chromatography column 14 (and/or choose a liquid chromatography column 14 with favourable properties e.g. a tightly packed stationary phase) to control (e.g. increase) the pressure within the liquid chromatography column 14; frictional heating effects may be more likely to arise when flow rate is increased or the liquid chromatography column 14 comprises a tightly packed stationary phase.

Independency of the pressure within the liquid chromatography column 14 and the flow rate through the liquid chromatography column 14 may be achieved because of the (incompressible) liquid mobile phase (i.e. a liquid solvent and the liquid solute). For example, when introducing liquid between the liquid chromatography column 14 and the restrictor 20 using the liquid pump 12 as described above, the liquid introduced may provide back-pressure against which the solvent in the liquid chromatography column 14 must act; however, since the solvent in the liquid chromatography column 14 is liquid, it may not compress (and therefore the flow through the liquid chromatography column 14 and/or the retention time of the solute (within the solvent) within the liquid chromatography column 14 may not be affected).

The flow rate through the liquid chromatography column 14 may be controlled to be substantially constant by controlling the solvent pump 10.

Maintaining a constant flow rate through the liquid chromatography column 14 by controlling the solvent pump 10 may provide advantages. In particular, this may result in increased processing control (e.g. possibility to control flow rate and pressure in the liquid chromatography column 14 independently), and/or may allow for increased minimisation of frictional heating effects within the liquid chromatography column 14 as described above. Further, maintaining a constant flow rate through the liquid chromatography column 14 by controlling the solvent pump 10 may result in increased separation of solute peaks, and therefore may allow for increased resolution of solute peaks.

The pressure within the liquid chromatography column 14 may be varied over a period of time independently of the flow rate through the liquid chromatography column 14.

With reference to FIGS. 2 and 6, varying pressure within the liquid chromatography column 14 over a period of time independently of the flow rate through the liquid chromatography column 14 may provide advantages. In particular, pressure gradients may be utilised to tune the retention time of the solute(s), e.g. a pressure gradient may be selected to separate solute peaks (i.e. to increase peak resolution). Accordingly, applying a pressure gradient may not affect the flow rate within the liquid chromatography column 14, reducing and/or minimising effects on the retention time of the solute(s); this may allow for greater processing control when carrying out the method of operating the chromatography arrangement as described above.

The pressure within the liquid chromatography column may be varied over a period of time from a first pressure value to a second pressure value. For example, the first pressure may be a relatively low pressure and the second pressure may be a relatively high pressure. The difference between the first pressure value and the second pressure value may be at least 100 bar, 200 bar, 300 bar, or 400 bar. As will be described with reference to FIG. 6 below, such methods can enable the separation of otherwise overlapping components of an analyte.

The pressure within the liquid chromatography column may be varied from the first pressure value to the second pressure value after elution or detection of a component of an analyte. Such methods can enable the separation of otherwise overlapping components of an analyte, as discussed below with reference to FIG. 6.

An analyte (or more than one analyte) may be flowed over the liquid chromatography column 14. Accordingly, the solute(s) may be the analyte(s) or the solvent may comprise the analyte(s). Accordingly, an analyte(s) may be identified using the method of operating the liquid chromatography arrangement 1 as described above, comprising any of, or any combination of, or all of, the associated advantages of the method as described above.

The analyte may have a mass greater than 5 kDa (kilodalton). The analyte may have a mass of a range from 5 kDa to 150 kDa or any value therebetween. The analyte may have a mass of a range from 5 kDa to 200 kDa or any value therebetween. Accordingly, analytes of mass greater than 5 kDa may be identified using the method of operating the liquid chromatography arrangement 1 as described above, comprising any of, or any combination of, or all of, the associated advantages of the method as described above.

The analyte may be a large biopolymer. The large biopolymer may have a mass greater than 5 kDa. The large biopolymer may have a mass of a range from 5 kDa to 150 kDa or any value therebetween. The large biopolymer may have a mass of a range from 5 kDa to 200 kDa or any value therebetween. Accordingly, large biopolymers may be identified using the method of operating the liquid chromatography arrangement 1 as described above, comprising any of, or any combination of, or all of, the associated advantages of the method as described above.

The large biopolymer may be a peptide, a protein, an oligo-nucleotide, or a nucleic acid. Accordingly, peptides, proteins, oligo-nucleotides, and/or nucleic acids may be identified using the method of operating the liquid chromatography arrangement 1 as described above, comprising any of, or any combination of, or all of, the associated advantages of the method as described above.

The pressure within the liquid chromatography column 14 may be controlled to be 450 bar or more. Additionally or alternatively, the pressure within the liquid chromatography column may be controlled to be 600 bar or more; or 700 bar or more; or 800 bar or more; or 900 bar or more; or 1000 bar or more; or 1100 bar or more; or 1200 bar or more; or 1300 bar or more; or 1400 bar or more; or 1500 bar or more. Additionally or alternatively, the pressure within the liquid chromatography column may be controlled to be within a range of from 250 bar to 1500 bar; or from 450 bar to 1500 bar; or from 450 bar to 1200 bar; or from within 450 bar to 900 bar.

Controlling the pressure within the liquid chromatography column 14 to be 450 bar or more may provide advantages; additionally or alternatively, controlling the pressure within the liquid chromatography column 14 to be any of the values or ranges of pressures as described above may provide advantages. In particular, and as shown in FIG. 3, increased pressure (e.g. from 465 bar to 666 bar) may increase peak separation between analytes (e.g. biopolymers), which may allow for a greater confidence in solute and/or analyte identification, and/or increased resolution of peaks representative of the analytes.

The liquid chromatography arrangement 1 may further comprise a detector 24 arranged to detect the presence of an analyte in a flow of liquid solvent from the liquid chromatography column 14.

The detector 24 may be arranged in the liquid chromatography arrangement 1 such that the flow of liquid solvent first flows through the restrictor 20 and then flows through the detector 24. Arranging the detector 24 such that the flow of liquid solvent first flows through the restrictor 20 and then flows through the detector 24 may provide advantages. In particular, the pressure of the liquid chromatography column 14 and the detector 24 may be controlled independently of one-another; for example, if it is required for the detector 24 to have a lower pressure at its inlet than the pressure in the liquid chromatography column 14, then a separate pressure control apparatus may be used to control the pressure of the detector 24.

Alternatively, the detector 24 may be arranged in the liquid chromatography arrangement 1 such that the flow of liquid solvent first flows through the detector 24 and then flows through the restrictor 20. Arranging the detector 24 such that the flow of liquid solvent first flows through the detector 24 and then flows through the restrictor 20 may provide advantages. In particular, if the detector 24 is placed after the restrictor 20 such that that the flow of liquid solvent first flows through the restrictor 20 and then flows through the detector 24 as described above, the restrictor may mix the solvent (and solute(s) and/or analyte(s)) flow such that the retention time of the solute and/or analyte in the flow path before the detector may be increased, and peaks representative of the solute(s) and/or analyte(s) may be broader, possibly resulting in lower resolution peaks representative of the solute(s) and/or analyte(s). Further, the solute may be diluted by additional liquid flow from the liquid pump 12, decreasing signal to noise ratios. By arranging the detector 24 such that the flow of liquid solvent first flows through the detector 24 and then flows through the restrictor 20, the flow mixing occurs after detection, and so the resolution of peaks representative of the solute(s) and/or analyte(s) may have a higher resolution (e.g. narrower peaks, improved peak separation).

The method may further comprise detecting the presence of an analyte in the flow of liquid solvent from the liquid chromatography column 14.

As the method of operating the liquid chromatography arrangement 1 as described above may provide advantages e.g. increased peak resolution, the methods described above may therefore allow for greater confidence in determining and identifying analytes.

The detector 24 may be or may comprise a UV detector. The detector 24 may comprise a PDA (Photodiode-Array Detection) detector.

The detector 24 may be or may comprise a mass spectrometer.

There is also provided a method of operating a mass spectrometer arrangement, the method may comprise the method of operating the chromatography arrangement 1 as described above.

The method of operating a mass spectrometer arrangement as described above may have any, or any combination of, or all of, the advantages of the method of operating the chromatography arrangement 1 as described above.

Representative Example and Method of Use of a Liquid Chromatography Arrangement 1

FIG. 1 shows a schematic view of a liquid chromatography arrangement 1 as described above. The liquid chromatography arrangement 1 may further comprise a sample manager 22, and/or a column manager 16, and/or a detector 24. The liquid chromatography arrangement 1 of the representative example may be a BioBinary Acquity Ultra-Performance Liquid Chromatography (UPLC®) system. A liquid pump 12 (e.g. a binary Acquity pump, i.e. a binary solvent manager) may also be included. The solvent pump 10 may be used to pump solvent and solute through the sample manager 22 and column manager 16. Using the liquid pump 12, a liquid flow may be provided and directed between the liquid chromatography column 14 outlet and detector 24 through a T-junction 18. Between the T-junction 18 and the detector 24, the restrictor 20 (e.g. a short restrictor capillary) may be placed to generate pressure in the liquid chromatography arrangement 1. This flow from the liquid pump 12 and the restriction of flow by the restrictor 20 may be used to control the pressure within the liquid chromatography column 14. By adjusting the flow rate of the liquid pump 12, the pressure may be set to an arbitrary value whilst maintaining a constant flow rate through the liquid chromatography column 14 (which may be controlled by the solvent pump 10). This way, frictional heat effects may be minimized. By inputting linear—or non-linear—gradient flow rate programs on the liquid pump 12, a pressure gradient within the liquid chromatography column 14 may be achieved.

In the representative example, the flow rate of the liquid pump 12 was varied between 0 and 0.8 mL/min to change the pressure within the liquid chromatography column 14. The liquid pumped from the liquid pump 12 may be water. Alternatively, if the solubility of the sample components allows, isopropanol-water mixture may be used (or even preferred as it may provide 2.5 times higher viscosity compared to water alone). In which case, lower flow may be set on the liquid pump 12 to generate the required pressure with less dilution in the post column flow path. Both isobar conditions and pressure gradients may be carried out in the representative example.

FIG. 2 shows representative examples of generating pressure gradients whilst maintaining constant flow rate through the column. Negative pressure gradients may be created by changing the flow rate of the solvent pump 10, e.g. from 0.6 to 0 mL/min, over a period of time, e.g. 10 minutes. A flow rate gradient may be used to generate a linearly decreasing pressure gradient (FIG. 2*a*), a flow rate gradient may be used to generate a convex negative pressure gradient (FIG. 2*b*), and a flow rate gradient may be used to generate a concave negative pressure gradient (FIG. 2*c*).

Figure 5:
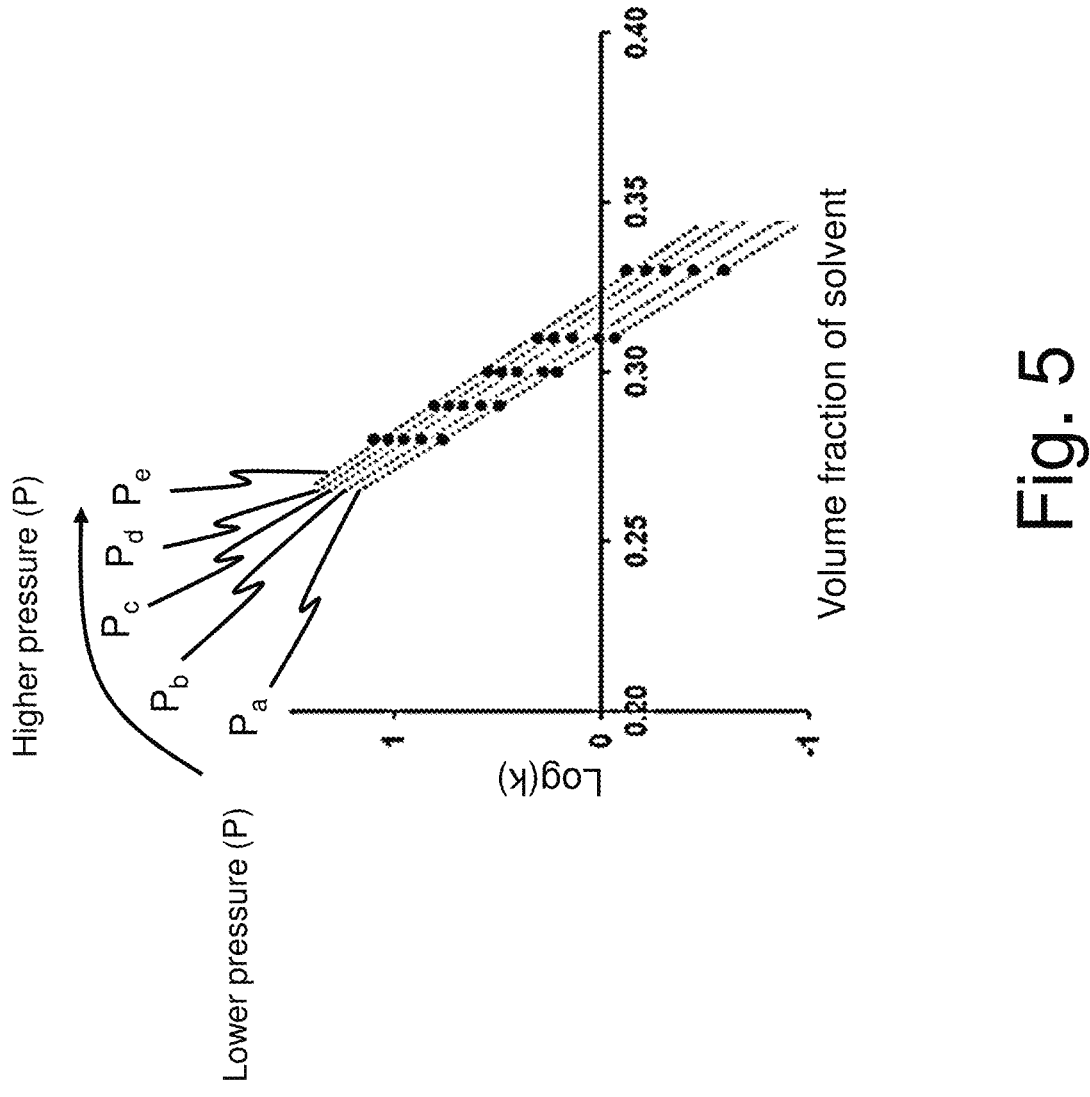
FIG. 5 shows graphs of the effect of volume fraction of solvent and pressure within a liquid chromatography column against the retention time of bovine insulin carried out using the method of operating a liquid chromatography arrangement according to an embodiment.

FIG. 5 illustrates the dependency of solute retention (k) on operating pressure (log k–volume fraction of solvent plot). The retention factor of bovine insulin was measured at 28, 29, 30, 31 and 33% acetonitrile (e.g. the volume percent of solvent) (five different isocratic conditions) and at five different operating pressures ($P_a$=254 bar, $P_b$=393 bar, $P_c$=535 bar, $P_d$=670 bar, and $P_e$=786 bar). Pressure was varied by setting 0, 0.2, 0.4, 0.6 and 0.8 mL/min flow rate with the liquid pump 12. As can be seen from FIG. 5, increasing pressure within the liquid chromatography column may result in increased retention time (log(k)).

FIG. 3 shows an example of utilizing pressure as a variable to adjust selectivity (and elution order change, i.e. the order in which solute peaks are detected), which may affect the resolution of solute peaks. Insulin (A) and cytochrome C (B) were separated at various pressures whilst maintaining other processing conditions constant, the other conditions comprising eluent strength, mobile phase composition, temperature, and liquid chromatography arrangement.

As shown in FIG. 3, methods of operating a liquid chromatography arrangement as described above may provide advantages. In particular, overlapping peaks corresponding to specific biopolymers (e.g. bovine insulin (A) and cytochrome C (B) in FIG. 3) may be separated by altering (e.g. increasing) the pressure of the liquid chromatography column 14. Accordingly, the method as described above may allow for increased selectivity and/or resolution of peaks representative of solutes.

FIG. 6 shows examples of the effect of varying pressure over a period of time from a first pressure value to a second pressure value.

The four graphs of FIG. 6 have x-axes of time in minutes. The y-axes represent the presence of an analyte measured in arbitrary units and pressure measured in bar. The analyte is a mixture of 4 synthetic oligo-nucleotides of 40 nt, 60 nt, 80 nt, and 100 nt in length. The longer, larger, synthetic oligo-nucleotides have the longer retention times. It is recognised that separation of mixtures of such oligo-nucleotides may be challenging. In particular, usually, column chromatography has decreased selectivity for longer oligo-nucleotides. Past approaches have used solvent gradients to attempt to resolve 80 nt and 100 nt peaks; however, such separation is difficult and may not always be possible. The example of FIG. 6 uses positive pressure steps to improve selectivity between consecutively eluting species. The example of FIG. 6 demonstrates that selectivity may be set as desired by only changing the operating pressure from a first pressure value to a second pressure value.

In the top left graph the pressure was maintained at a first pressure (approx. 500 bar). In the remaining 3 graphs, the first pressure is a relatively low pressure and the second pressure is a relatively high pressure. In the top right graph, the first pressure was approximately 500 bar and the second pressure was approximately 950 bar and the pressure was varied from the first pressure to the second pressure after approximately 2.5 minutes. This corresponds to a pressure step after the elution of 1 peak. In the bottom left graph, the first pressure was again approximately 500 bar and the second pressure was approximately 950 bar; however, the pressure was varied from the first pressure to the second pressure after approximately 2.9 minutes. This corresponds to a pressure step after the elution of 2 peaks. In the bottom right graph, the first pressure was again approximately 500 bar and the second pressure was approximately 950 bar; however, the pressure was varied from the first pressure to the second pressure after approximately 3.3 minutes. This corresponds to a pressure step after the elution of 3 peaks.

As will be apparent, such methods have changed the retention times of the analytes. As the retention times of the analytes have been changed, the separation of otherwise overlapping analytes has been facilitated. In particular, as shown in the bottom right graph, the 4 oligo-nucleotides have been well separated by increasing the pressure from a first pressure to a second pressure after the elution of 3 peaks (corresponding to 3 oligo-nucleotides). Of course, as would be apparent to the skilled person, the exact pressures and timings to use to achieve good separation will depend on the analyte of interest.

The pressure within the liquid chromatography column may be varied from the first pressure value to the second pressure value after elution or detection of a component of an analyte. Such methods can enable the separation of otherwise overlapping analytes, as discussed above.

The examples of FIG. 6 were performed on a modified Waters H Class Plus instrument, including a secondary pump, a Premier BEH C18 50×2.1 mm column, with a mobile phase of A: 14 mM TEA, 100 mM HFIP in water, B: 50% A 50% MeOH, gradient: 32-42% B in 5 min, at a flow rate: 0.2 mL/min, and T=60° C.

The representative examples and features as described above may not be limited to the specific biopolymers of the examples; the processing effects and advantages (e.g. peak separation, pressure and retention time relationships) may occur with any suitable solute(s) and/or analyte(s) e.g. biopolymers such as, but not limited to, peptides, proteins, oligo-nucleotides, nucleic acids, etc.

There is also provided a liquid chromatography arrangement 1 comprising:

a solvent pump 10 arranged to flow a liquid solvent over a liquid chromatography column 14;

a restrictor 20 arranged to restrict the liquid solvent from leaving the liquid chromatography column 14; and a liquid pump 12 arranged to provide liquid flow between the liquid chromatography column and the restrictor.

The solvent may comprise at least one solute. Accordingly, flowing liquid solvent through the liquid chromatography column 14 may comprise flowing liquid solvent and (liquid) solute(s) through the liquid chromatography column 14 using the solvent pump 10.

The liquid chromatography arrangement 1 as described above may have any, or any combination of, or all of, the advantages of the method of operating the chromatography arrangement 1 as described above.

In use, the pressure within the liquid chromatography column may be variable independently of the flow rate through the liquid chromatography column.

Varying pressure within the liquid chromatography column 14 over a period of time independently of the flow rate through the liquid chromatography column 14 may provide advantages. In particular, pressure gradients may be utilised to tune the retention time of the solute(s), e.g. a pressure gradient may be selected to separate solute peaks. Accordingly, applying a pressure gradient may not affect the flow rate within the liquid chromatography column 14, reducing and/or minimising effects on the retention time of the solute(s); this may allow for greater processing control when carrying out the method of operating the chromatography arrangement as described above.

The pressure within the liquid chromatography column may be controllable to be 450 bar or more. Additionally or alternatively, the pressure within the liquid chromatography column may be controlled to be 600 bar or more; or 700 bar or more; or 800 bar or more; or 900 bar or more; or 1000 bar or more; or 1100 bar or more; or 1200 bar or more; or 1300 bar or more; or 1400 bar or more; or 1500 bar or more. Additionally or alternatively, the pressure within the liquid chromatography column may be controlled to be within a range of from 250 bar to 1500 bar; or from 450 bar to 1500 bar; or from 450 bar to 1200 bar; or from within 450 bar to 900 bar.

Controlling the pressure within the liquid chromatography column to be 450 bar or more may provide advantages. In particular, and as shown in FIG. 3, increased pressure (e.g. from 465 bar to 666 bar) may increase peak separation between analytes (e.g. biopolymers), which may allow for a greater confidence in solute and/or analyte identification, and/or increased resolution of peaks representative of the analytes.

There is also provided a computer readable medium having instructions stored thereon which, when executed by a processor, cause the performance of a method described above of operating a liquid chromatography arrangement 1.

The computer readable medium as described above may have any, or any combination of, or all of, the advantages of the method of operating the chromatography arrangement 1 as described above.

There is also provided a computer program comprising instructions which, when executed by a processor, cause the performance of a method described above of operating a liquid chromatography arrangement 1.

The computer program as described above may have any, or any combination of, or all of, the advantages of the method of operating the chromatography arrangement 1 as described above.

There is also provided a system comprising at least one processor and a computer readable medium, wherein the computer readable medium has instructions stored thereon which, when executed by the at least one processor, cause the system to perform a method described above of operating a liquid chromatography arrangement 1.

The system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

The system as described above may have any, or any combination of, or all of, the features of the chromatography arrangement 1 and/or the advantages of the method of operating the chromatography arrangement 1 as described above.

There is also provided a chromatography system comprising at least one processor and a computer readable medium, wherein the computer readable medium has instructions stored thereon which, when executed by the at least one processor, cause the chromatography system to perform a method described above of operating a liquid chromatography arrangement 1.

The chromatography system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

The chromatography system as described above may have any, or any combination of, or all of, the features of the chromatography arrangement 1 and/or the advantages of the method of operating the chromatography arrangement 1 as described above.

There is also provided a mass spectrometry system comprising at least one processor and a computer readable medium, wherein the computer readable medium has instructions stored thereon which, when executed by the at least one processor, cause the mass spectrometry system to perform a method described above of operating a liquid chromatography arrangement 1.

The mass spectrometry system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

The mass spectrometry system as described above may have any, or any combination of, or all of, the features of the chromatography arrangement 1 and/or the advantages of the method of operating the chromatography arrangement 1 as described above.

A further computer program is also provided. The computer program may comprise instructions which, when the program is executed by a processor, cause the performance of a method described above of operating a mass spectrometer arrangement.

The further computer program as described above may have any, or any combination of, or all of, the features of the chromatography arrangement 1 and/or the features of the mass spectrometer and/or the advantages of the method of operating the chromatography arrangement 1 as described above.

There is also provided a further computer readable medium having instructions stored thereon which, when executed by a processor, cause the performance of a method described above of operating a mass spectrometer arrangement.

There is also provided a further system comprising at least one processor and a computer readable medium, wherein the computer readable medium has instructions stored thereon which, when executed by the at least one processor, cause the system to perform a method described above of operating a mass spectrometer arrangement.

There is also provided a further chromatography system comprising at least one processor and a computer readable medium, wherein the computer readable medium has instructions stored thereon which, when executed by the at least one processor, cause the further chromatography system to perform a method described above of operating a mass spectrometer arrangement.

The further chromatography system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

The further chromatography system 18 as described above may have any, or any combination of, or all of, the advantages of the method of operating the mass spectrometry arrangement as described above.

There is also provided a further mass spectrometry system comprising at least one processor and a computer readable medium, wherein the computer readable medium has instructions stored thereon which, when executed by the at least one processor, cause the further mass spectrometry system to perform a method described above of operating a mass spectrometer arrangement.

The further mass spectrometry system may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

The further mass spectrometry system as described above may have any, or any combination of, or all of, the advantages of the method of operating the mass spectrometry arrangement as described above.

The systems may comprise a processor and a computer readable medium. The computer readable medium may be configured to store instructions for execution by the processor. The processor may comprise a number of sub-processors which may be configured to work together, e.g. in parallel with each other, to execute the instructions. The sub-processors may be geographically and/or physically separate from each other and may be communicatively coupled to enable coordinated execution of the instructions.

The computer readable media may be any desired type or combination of volatile and/or non-volatile memory such as, for example, static random access memory (SRAM), dynamic random access memory (DRAM), flash memory, read-only memory (ROM), and/or a mass storage device (comprising, for example, an optical or magnetic storage device).

The systems, chromatography systems, and/or mass spectrometry systems comprising the processor and computer readable medium, may be provided in the form of a server, a desktop computer, a laptop computer, or the like.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

The invention claimed is:

1. A method of operating a liquid chromatography arrangement, the liquid chromatography arrangement comprising:

a solvent pump arranged to flow a liquid solvent over a liquid chromatography column;

a restrictor arranged to restrict the liquid solvent from leaving the liquid chromatography column; and a liquid pump arranged to provide liquid flow between the liquid chromatography column and the restrictor, the method comprising:

flowing the liquid solvent through the liquid chromatography column using the solvent pump; and controlling a liquid pressure within the liquid chromatography column by providing a liquid flow between the liquid chromatography column and the restrictor using the liquid pump, wherein the pressure within the liquid chromatography column is varied over a period of time independently of a flow rate through the liquid chromatography column by controlling the liquid flow between the liquid chromatography column and the restrictor using the liquid pump.

2. The method of operating a liquid chromatography arrangement according to claim 1, wherein the pressure within the liquid chromatography column is varied over a period of time from a first pressure value to a second pressure value.

3. The method of operating a liquid chromatography arrangement according to claim 2, wherein the pressure within the liquid chromatography column is varied from the first pressure value to the second pressure value after elution or detection of a component of an analyte.

4. The method of operating a liquid chromatography arrangement according to claim 2, wherein a difference between the first pressure value and the second pressure value is at least 100 bar.

5. The method of operating a liquid chromatography arrangement according to claim 1, wherein an analyte is flowed over the liquid chromatography column and wherein the analyte has a mass greater than 5 kDa.

6. The method of operating a liquid chromatography arrangement according to claim 5, wherein the analyte is a large biopolymer.

7. The method of operating a liquid chromatography arrangement according to claim 6, wherein the large biopolymer is a peptide, a protein, an oligo-nucleotide, or a nucleic acid.

8. The method of operating a liquid chromatography arrangement according to claim 1, wherein the pressure within the liquid chromatography column is controlled to be 450 bar or more.

9. The method of operating a liquid chromatography arrangement according to claim 1, wherein the liquid chromatography arrangement further comprises a detector arranged to detect a presence of an analyte in a flow of the liquid solvent from the liquid chromatography column, and wherein the method further comprises detecting the presence of the analyte in the flow of the liquid solvent from the liquid chromatography column.

10. The method of operating a liquid chromatography arrangement according to claim 9, wherein the detector is or comprises a UV detector.

11. The method of operating a liquid chromatography arrangement according to claim 9, wherein the detector is or comprises a mass spectrometer.

12. A liquid chromatography arrangement comprising:
a solvent pump configured to flow a liquid solvent over a liquid chromatography column;
a restrictor configured to restrict the liquid solvent from leaving the liquid chromatography column; and
a liquid pump configured to provide liquid flow between the liquid chromatography column and the restrictor,
wherein in use the pressure within the liquid chromatography column is configured to be varied independently of the flow rate through the liquid chromatography column.

13. The liquid chromatography arrangement according to claim 12, wherein the pressure within the liquid chromatography column is controllable to be 450 bar or more.

14. A chromatography system comprising at least one processor and a computer readable medium, wherein the computer readable medium has instructions stored thereon which, when executed by the at least one processor, cause the chromatography system to perform the method of claim 1.

* * * * *